(12) United States Patent
Abushawashi et al.

(10) Patent No.: US 11,040,666 B2
(45) Date of Patent: Jun. 22, 2021

(54) VEHICLE GLOVE BOX BIN

(71) Applicant: Ford Global Technologies, LLC, Dearborn, MI (US)

(72) Inventors: Yalla Mussa Abushawashi, Canton, MI (US); Marwan Ahmad Elbkaily, Canton, MI (US); Matthew James Enciso, Dearborn Heights, MI (US); Abdelrahim Khal, Dearborn, MI (US); Jon Maninga, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 16/282,649

(22) Filed: Feb. 22, 2019

(65) Prior Publication Data

US 2020/0269766 A1  Aug. 27, 2020

(51) Int. Cl.
   *B60R 7/06* (2006.01)
   *B60R 11/00* (2006.01)
(52) U.S. Cl.
   CPC ......... *B60R 7/06* (2013.01); *B60R 2011/0005* (2013.01); *B60R 2011/0082* (2013.01)
(58) Field of Classification Search
   CPC . B60R 2021/0051; B60R 21/045; B60R 7/06; B60R 2021/0407; B60R 21/205
   USPC .... 296/37.12, 37.1, 37.8, 70, 187.05, 24.34, 296/1.08, 37.9; 224/483, 282, 539
   See application file for complete search history.

(56) References Cited

U.S. PATENT DOCUMENTS

| | | | |
|---|---|---|---|
| 7,874,587 B2 | 1/2011 | Miki et al. | |
| 8,118,348 B2* | 2/2012 | Taracko | B60R 21/045 296/187.05 |
| 9,771,743 B2 | 9/2017 | Roychoudhury et al. | |
| 10,099,625 B1 | 10/2018 | Lu et al. | |
| 10,343,613 B1* | 7/2019 | Liu | B60R 7/06 |
| 2004/0041385 A1* | 3/2004 | Garnweidner | B60R 21/045 280/752 |
| 2007/0205624 A1* | 9/2007 | Zellner, Jr. | B60R 7/06 296/37.12 |
| 2009/0020993 A1* | 1/2009 | Cappabianca | B60R 21/045 280/752 |

(Continued)

FOREIGN PATENT DOCUMENTS

CN  202986980 U  6/2013
KR  101193626 B1  10/2012

*Primary Examiner* — D Glenn Dayoan
*Assistant Examiner* — Sunsurraye Westbrook
(74) *Attorney, Agent, or Firm* — David Coppiellie; Price Heneveld LLP (57) ABSTRACT

A glove box retainer assembly for retaining a glove box in a closed position during a frontal impact event of a vehicle includes an instrument panel of the vehicle and a bin is coupled to the instrument panel. The bin includes a base coupled to a rearward wall, a forward wall, and a side wall positioned between the rearward wall and the forward wall. A plurality of ribs is coupled to the forward wall. A collapsible feature is coupled to the side wall. An arm feature is coupled to the side wall and is defined by a slot feature in the side wall that feature extends from an upper rim of the side wall toward the forward wall. The collapsible feature is configured to collapse and the arm feature is configured to protrude outward from the side wall and engage the instrument panel in response to the application of a sufficient force.

20 Claims, 6 Drawing Sheets

(56) References Cited

U.S. PATENT DOCUMENTS

| | | | | |
|---|---|---|---|---|
| 2010/0148531 A1* | 6/2010 | Evans | .................. | E05B 15/022 |
| | | | | 296/37.12 |
| 2012/0126563 A1* | 5/2012 | Kuwano | .................. | B60R 7/06 |
| | | | | 296/37.12 |

* cited by examiner

VEHICLE GLOVE BOX BIN

FIELD OF THE INVENTION

The present invention generally relates to vehicle glove boxes. In particular, the present invention relates to bins of vehicle glove boxes.

BACKGROUND OF THE INVENTION

Vehicles are commonly equipped with glove boxes located within instrument panels of the vehicles. The glove boxes often are openable and close via a latch feature.

SUMMARY OF THE INVENTION

According to one aspect of the present invention, a glove box retainer assembly for retaining a glove box in a closed position during a frontal impact event of a vehicle is disclosed. The glove box retainer assembly includes an instrument panel of the vehicle. A bin is coupled to the instrument panel. The bin includes a base coupled to a rearward wall, a forward wall, and a side wall. The side wall is positioned between the rearward wall and the forward wall. A plurality of ribs is coupled to the forward wall. A collapsible feature is coupled to the side wall. An arm feature is coupled to the side wall and is defined by a slot feature in the side wall. The slot feature extends from an upper rim of the side wall toward the forward wall. The collapsible feature is configured to collapse and the arm feature is configured to protrude outward from the side wall and engage the instrument panel in response to the application of a sufficient force to the forward wall of the bin.

Embodiments of the first aspect of the invention can include any one or a combination of the following features:
- the plurality of ribs coupled to the forward wall terminate before reaching a corner between the forward wall and the side wall of the bin;
- the plurality of ribs protrude further outward from the forward wall as the ribs extend in a bin-outboard direction;
- the collapsible feature is configured to collapse such that the side wall of the bin deforms in an outward direction;
- the side wall comprises a forward portion positioned between the forward wall and the collapsible feature and a rearward portion positioned between the rearward wall and the collapsible feature, and wherein the arm feature is directly coupled to the forward portion; and
- the arm feature is configured to be substantially planar to the side wall of the bin prior to the collapse of the collapsible feature.

According to another aspect of the present invention, a bin for use in a vehicle is disclosed. The bin includes a base, a forward wall coupled to the base, a rearward wall coupled to the base, and a side wall coupled to the base. The side wall is positioned between the forward wall and the rearward wall of the bin. The side wall includes an arm feature. The arm feature is operable between and undeployed position and a deployed position in which the arm feature is configured to protrude outward from the side wall. The side wall further includes a collapsible feature that is operable between and extended position and a collapsed position. The arm feature is configured to move from the undeployed position to the deployed position as the collapsible feature moves from the extended position to the collapsed position.

Embodiments of the second aspect of the invention can include any one or a combination of the following features:
- a plurality of ribs coupled to the forward wall of the bin;
- the side wall comprises a forward portion positioned between the forward wall and the collapsible feature and a rearward portion positioned between the rearward wall and the collapsible feature, and wherein the arm feature is directly coupled to the forward portion;
- the arm feature is substantially planar with the forward portion of the side wall and the rearward portion of the side wall while in the undeployed position;
- the arm feature is configured to move with the forward portion of the side wall relative to the rearward portion of the side wall as the collapsible feature moves from the extended position to the collapsed position;
- the arm feature is generally planar with the forward portion of the side wall while in the deployed position; and
- the side wall of the bin and the arm feature define a slot feature positioned between the side wall and the arm feature, According to yet another aspect of the present disclosure, a bin is disclosed. The bin includes a base coupled to a forward wall, a rearward wall, and a side wall. The side wall is positioned between the forward wall and the rearward wall. An upper rim extends along the forward, rearward, and side walls of the bin. A collapsible feature extends along at least a portion of the side wall in a direction generally perpendicular to the upper rim of the side wall. A slot feature is defined by the side wall and originates from a gap in the upper rim of the side wall between the collapsible feature and the rearward wall of the bin. The slot feature extends below the upper rim of the side wall at least to the collapsible feature. An arm feature extends from the side wall. The arm feature includes an upper periphery and a lower periphery. The upper periphery comprises the upper rim of the side wall. The lower periphery defines at least a portion of the slot feature.

Embodiments of the third aspect of the invention can include any one or a combination of the following feature:
- the slot feature extends in a generally perpendicular direction relative to the collapsible feature;
- a plurality of ribs coupled to the forward wall of the bin;
- the collapsible feature defines at least a portion of the slot feature;
- the collapsible feature comprises a groove in the side wall of the bin;
- the side wall comprises a forward portion positioned between the forward wall and the collapsible feature and a rearward portion positioned between the rearward wall and the collapsible feature, and wherein the collapsible feature is configured to buckle outwardly in response to sufficient force being applied to the forward wall of the bin; and
- the arm feature is configured rotate with the forward portion of the side wall as the collapsible feature buckles and protrude outward therefrom.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1A-5, a glove box retainer assembly 8 for retaining a glove box of a vehicle 10 is disclosed. The glove box retainer assembly 8 includes an instrument panel 14 of the vehicle 10. A bin 26 is coupled to the instrument panel 14. The bin 26 includes a base 28 coupled to a rearward wall 32, a forward wall 30, and a side wall 34. The side wall 34 is positioned between the rearward wall 32 and the forward wall 30. A plurality of ribs 40 is coupled to the forward wall 30. A collapsible feature 44 is coupled to the side wall 34. An arm feature 50 is coupled to the side wall 34 and is defined by a slot feature 48 in the side wall 34. The slot feature 48 extends from an upper rim 38 of the side wall 34 toward the forward wall 30. The collapsible feature 44 is configured to collapse and the arm feature 50 is configured to protrude outward from the side wall 34 and engage the instrument panel 14 in response to the application of a sufficient force to the forward wall 30 of the bin 26.

Figure 1A:
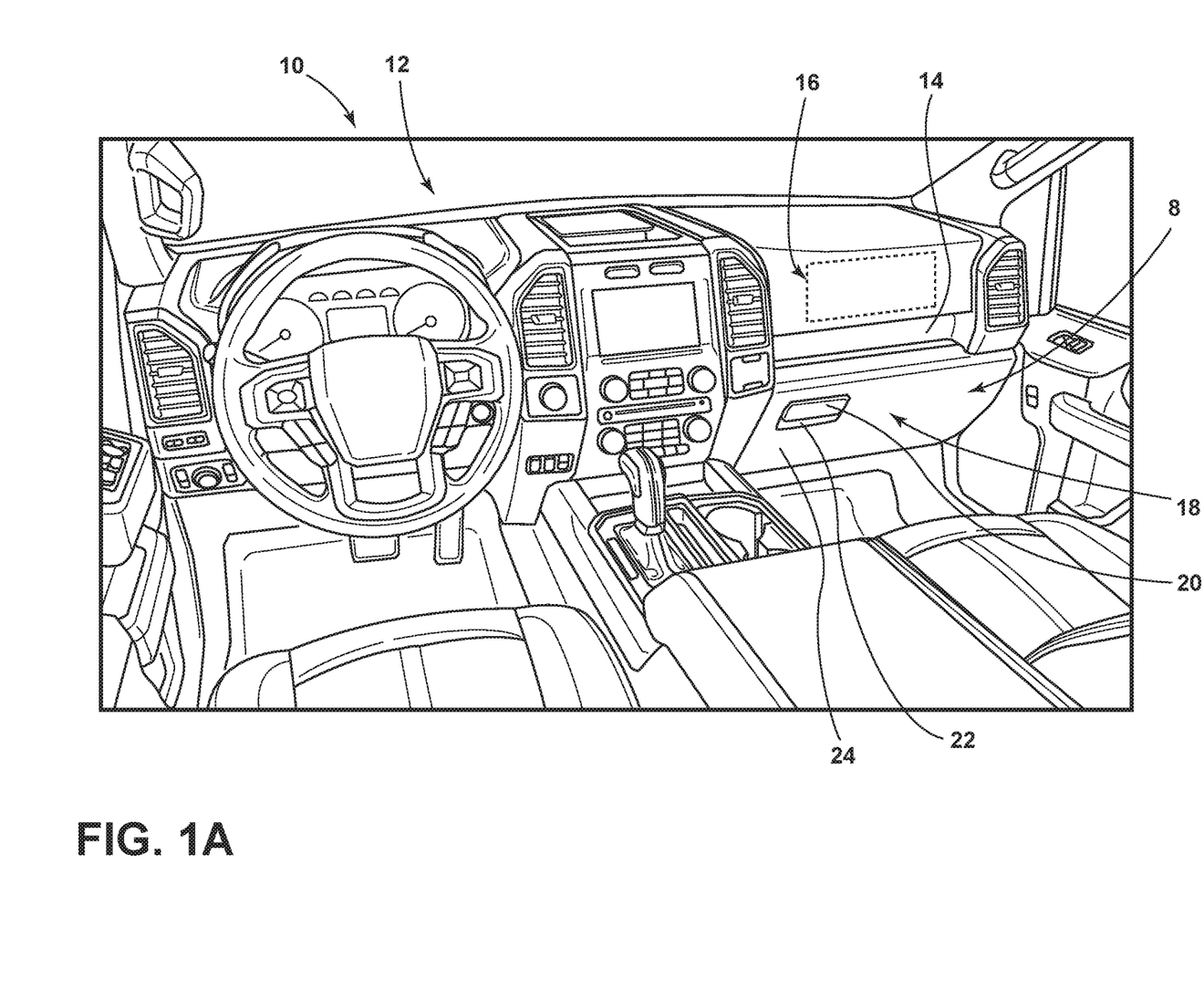
FIG. 1A is a perspective view of the front side passenger compartment of a vehicle, illustrating a glove box in a closed position within a vehicle interior of the vehicle, according to one embodiment.
Figure 1B:
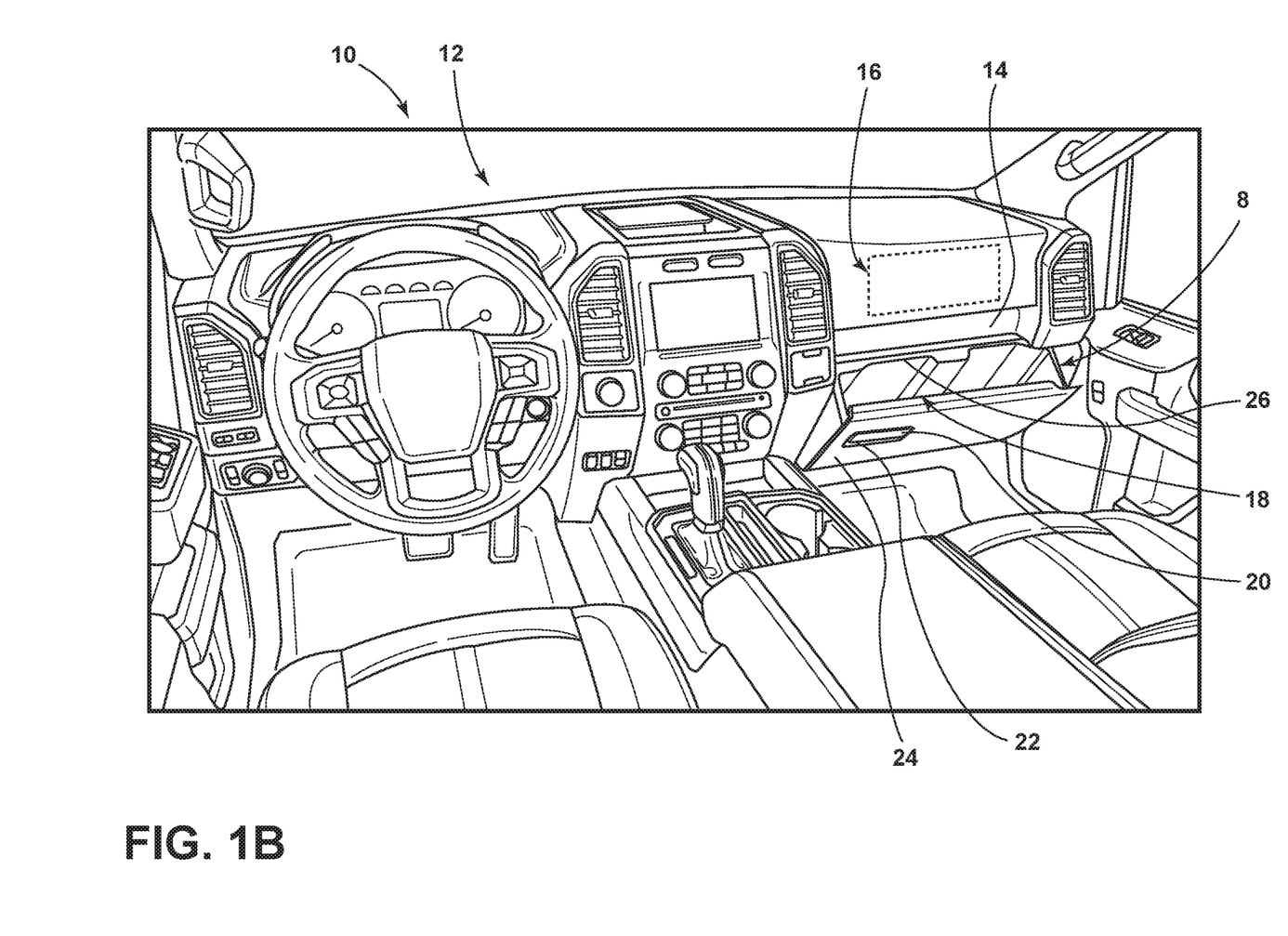
FIG. 1B is a perspective view of the vehicle, illustrating the glove box in an open position within the vehicle interior of the vehicle, according to one embodiment.

In reference to FIGS. 1A and 1B, a vehicle 10, such as a wheeled motor vehicle, is disclosed. The vehicle 10 includes a vehicle interior 12. The vehicle interior 12 includes an instrument panel 14. In various embodiments, the vehicle 10 includes a heating, ventilation, and air conditioning unit ("HVAC unit") 16. In some embodiments, the HVAC unit 16 is positioned vehicle forward of the instrument panel 14.

In further reference to FIGS. 1A and 1B, in various embodiments, the vehicle interior 12 includes a glove box 18. The glove box 18 may be coupled to and/or positioned within the instrument panel 14. The glove box 18 may include an outer door 24 that faces into the vehicle interior 12. In various embodiments, the glove box 18 may be operable between a closed position, as shown in FIG. 1A and an open position, as shown in FIG. 1B. The glove box 18 may include a handle or other opening feature 20 that may be operated by a user to open the glove box 18. In various embodiments, the glove box may be retained in the closed position via a locking feature 22. In some embodiments, operation of the opening feature 20 may disengage the locking feature 22, such that the glove box may be opened by the user. In some circumstances, the glove box 18 may be opened without operation of the opening feature 20 and/or despite the locking feature 22 being engaged. For example, if the vehicle 10 undergoes a frontal impact event, as may occur in a vehicle collision, the glove box 18 may open involuntarily due to forces exerted upon the glove box 18.

Figure 2:
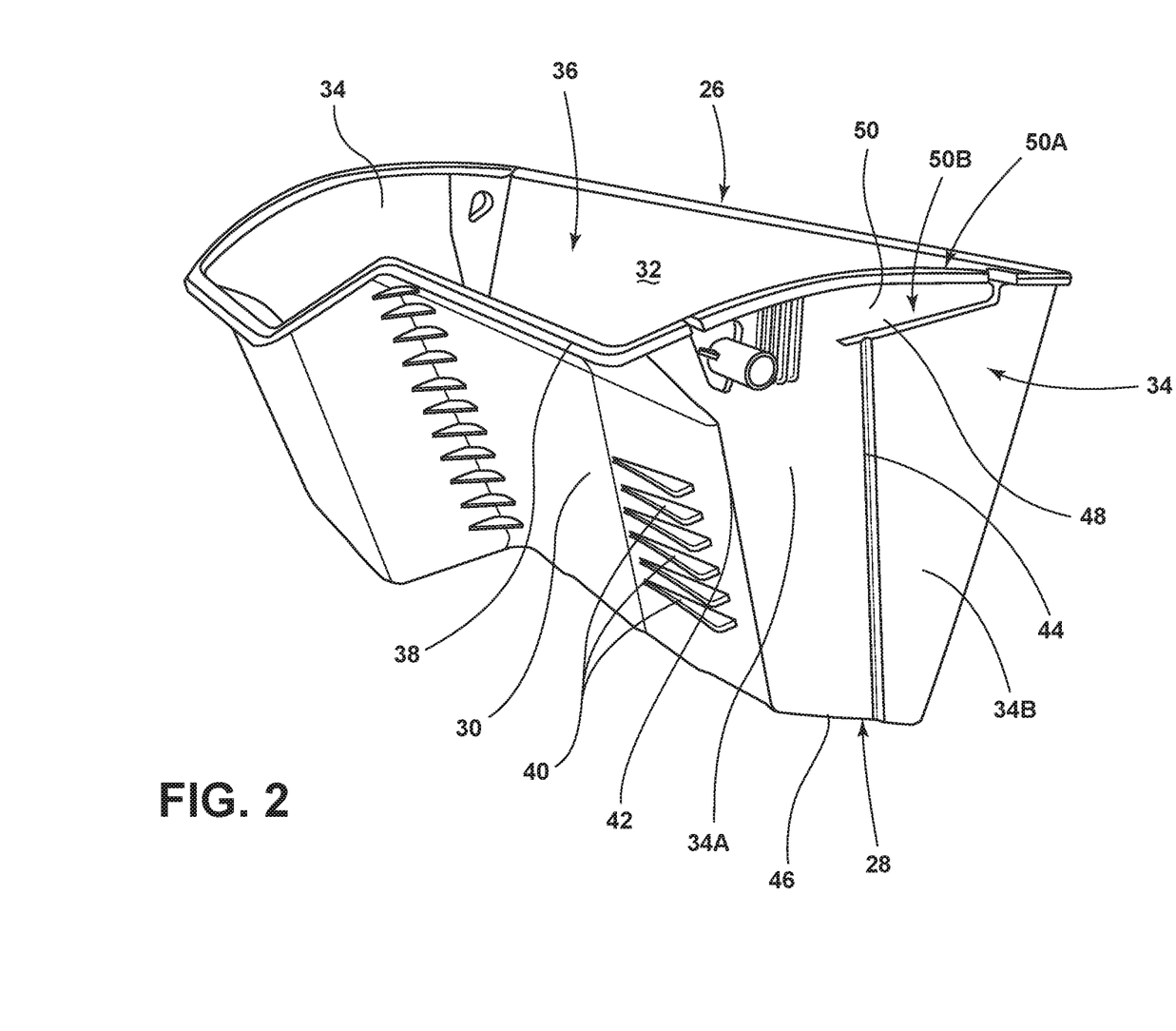
FIG. 2 is a perspective view of a bin, illustrating a plurality of ribs coupled to a forward wall of the glove box and a collapsible feature and arm feature coupled to a side wall of the glove box, according to one embodiment.

Referring now to FIGS. 1A and 2, the glove box 18 may include a bin 26. In various embodiments, the bin 26 may be coupled to the outer door 24. In some embodiments, the bin 26 may be integrally coupled with the outer door 24. The bin 26 may include a base 28. A forward wall 30, a rearward wall 32, and a side wall 34 may be coupled to the base 28. In various embodiments, the side wall 34 may be positioned between the rearward wall 32 and the forward wall 30. The side wall 34 may couple the rearward wall 32 to the forward wall 30. It is contemplated that there may be one or more side walls 34. For example, as shown in FIG. 2, the bin 26 may have two side walls 34, each of which is positioned between the forward wall 30 and the rearward wall 32. In various embodiments, the rearward wall 32 may be coupled to and/or generally face the outer door 24 of the glove box 18. The forward wall 30 may be positioned opposite the rearward wall 32. In some embodiments, the forward wall 30 may generally face vehicle-forward.

As further shown in FIG. 2, the rearward wall 32, the forward wall 30, and the side wall 34 of the bin 26 may define an inner cavity 36. In various embodiments, the bin 26 may include an upper rim 38. The upper rim 38 may extend along the upper edge of the forward wall 30, the rearward wall 32, and the side wall 34. In some embodiments, the upper rim 38 may define an opening of the inner cavity 36. It is contemplated that, in various embodiments, the upper rim 38 may not extend continuously around the forward wall 30, rearward wall 32, and/or side wall 34. For example, the upper rim 38 may be interrupted by another feature, such as a slot or cutout defined by the bin 26.

Referring again to FIG. 2, the forward wall 30 may include a plurality of ribs 40 that extend along a portion of the forward wall 30. In various embodiments, the ribs 40 may terminate before reaching a corner 42 between the forward wall 30 and the side wall 34 of the bin 26. For example, in some embodiments, the ribs 40 may terminate about ten millimeters away from the corner 42 between the forward wall 30 and the side wall 34. It is contemplated that the ribs 40 may terminate a smaller or larger distance from the corner 42. As illustrated in FIG. 2, in some embodiments, the plurality of ribs 40 may protrude further outward from the forward wall 30 as the ribs 40 extend in the bin-outboard direction. The plurality of ribs 40 may be a variety of lengths, widths, and/or heights. For example, in some embodiments, the plurality of ribs 40 may be about one millimeter in width and may protrude outward from the surface of the forward wall 30 to a distance of about four millimeters. In some embodiments, the distance that the outward-most portions of the plurality of ribs 40 protrude from the forward wall 30 may be greater than or less than four millimeters. This distance may be relatively larger for pluralities of ribs 40 that terminate further from the corner 42 and may be relatively smaller for pluralities of ribs 40 that terminate closer to the corner 42. For example, the outward-most portion of ribs 40 that terminate ten millimeters from the corner 42 may protrude four millimeters from the forward wall 30, while the outward-most portion of ribs 40 that terminate fifteen millimeters from the corner 42 may protrude six millimeters from the forward wall 30. In various embodiments, the plurality of ribs 40 may be configured to direct an object and/or the force of an object colliding with the forward wall 30 of the bin 26 toward a forward wall-inboard direction.

Figure 3:
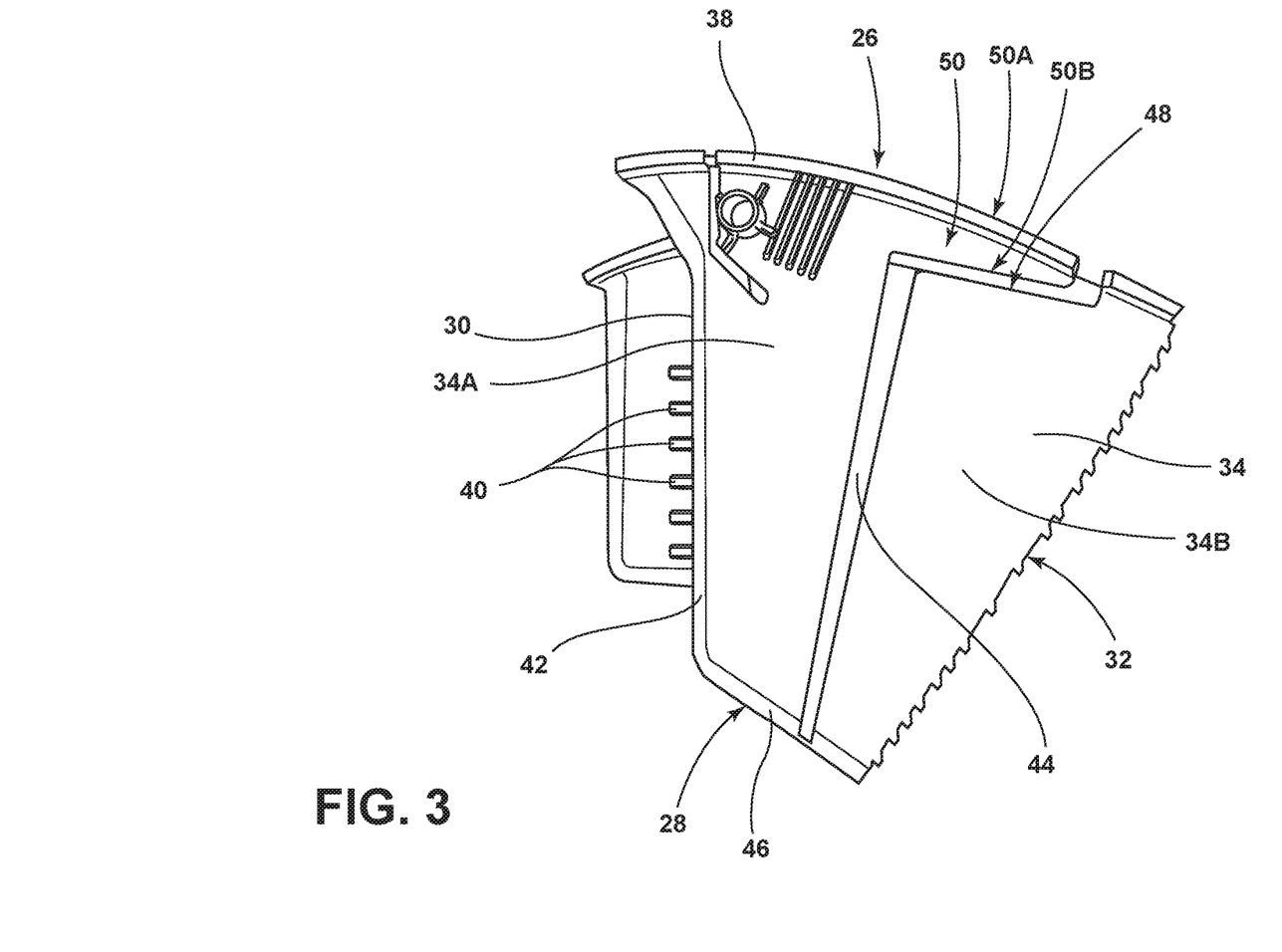
FIG. 3 is a side view of the bin, illustrating the collapsible feature in an extended position and the arm feature in an undeployed position, according to one embodiment.

Referring now to FIGS. 2 and 3, the side wall 34 may include a collapsible feature 44 coupled to the side wall 34. The collapsible feature 44 may be integrally coupled to the side wall 34. In some embodiments, the collapsible feature 44 may extend along at least a portion of the side wall 34 in a direction generally perpendicular to the upper rim 38 of the side wall 34. In some embodiments, the collapsible feature 44 may extend along at least a portion of the side wall 34 in a direction substantially perpendicular to the upper rim 38 of the side wall 34. In various embodiments, the collapsible feature 44 may extend along the side wall 34 at least to a corner 46 of the bin 26 between the side wall 34 and the base 28. In some embodiments, the collapsible feature 44 may be positioned between a forward portion 34A of the side wall 34 and a rearward portion 34B of the side wall 34. In other words, in some embodiments, the side wall 34 may include the forward portion 34A positioned between the forward wall 30 and the collapsible feature 44 and the rearward portion 34B positioned between the rearward wall 32 and the collapsible feature 44.

The collapsible feature 44 may include at least one of a variety of features. For example in various embodiments, the collapsible feature may be a groove in the side wall 34. It is contemplated that in some examples, the collapsible feature 44 may be groove extending along an inner surface of the side wall 34 and/or the outer surface of the side wall 34. In some embodiments, the collapsible feature 44 may be a perforated seam extending along the side wall 34. In some embodiments, the collapsible feature 44 may include a cutout defined by the side wall 34 of the bin 26. In some embodiments, the collapsible feature 44 may include a panel in the side wall 34 that is comprised of a relatively flexible material. For example, in some embodiments, the collapsible feature 44 may include a panel comprised of a rubber material that is more malleable than the surrounding side wall 34 which may be comprised of a hard plastic. It is contemplated that the collapsible feature 44 and the side wall 34 may be made of at least one of a variety of materials. It is further contemplated that the collapsible feature 44 may include at least one of a variety of features that includes, but is not limited, the above-mentioned features, other features configured to collapse, and/or a combination thereof.

Figure 4:
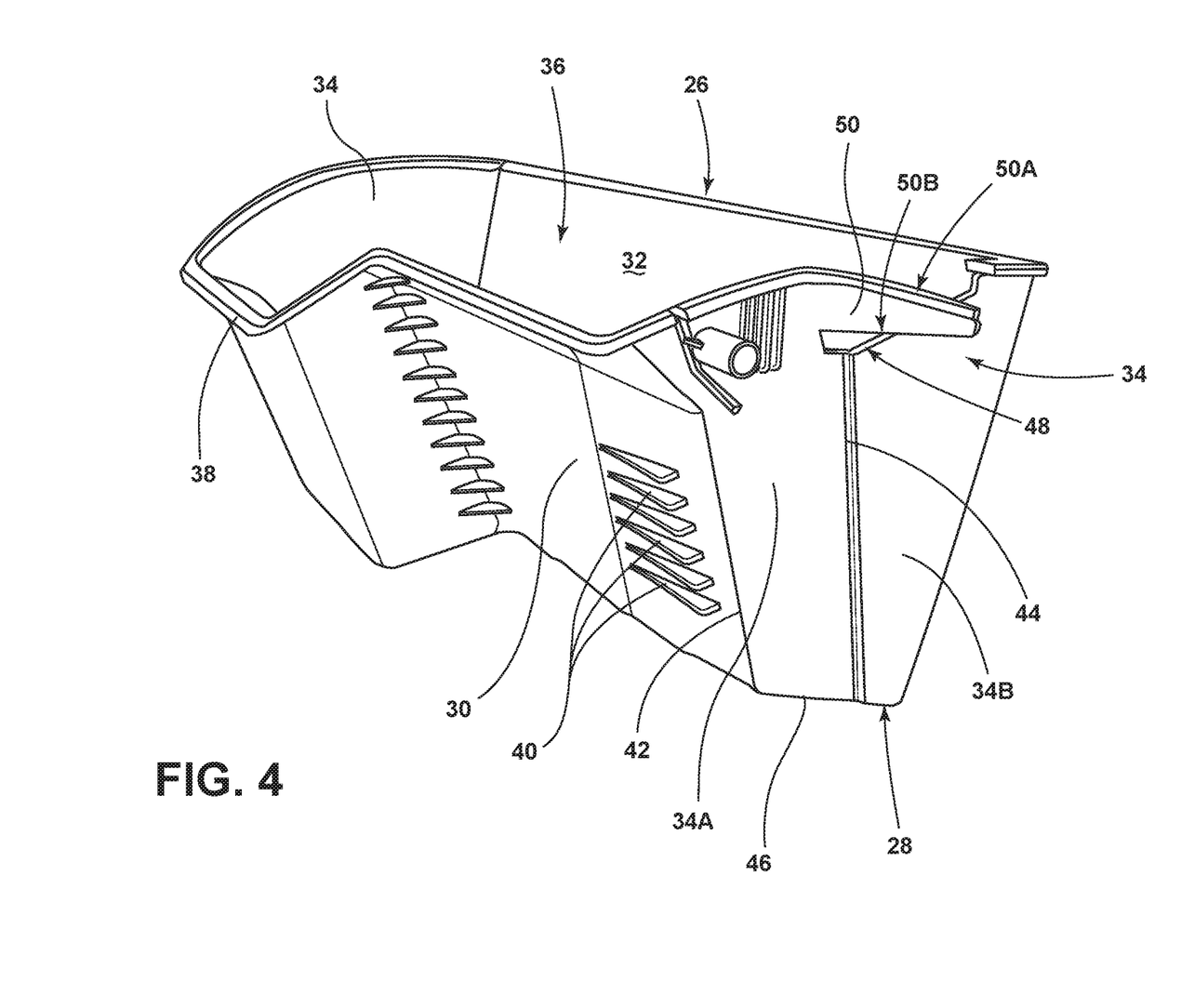
FIG. 4 is a perspective view of the bin, illustrating the collapsible feature in a collapsed position and the arm feature in a deployed position according to one embodiment.

Referring now to FIGS. 2-4, the collapsible feature 44 may be configured to collapse in response to sufficient force being applied to the bin 26. As such, in various embodiments, the collapsible feature 44 may be operable between an extended position, in which the collapsible feature 44 is not collapsed (depicted in FIGS. 2 and 3), and a collapsed position, in which the collapsible feature 44 is collapsed (depicted in FIG. 4). In some embodiments, the collapsible feature 44 may be configured to collapse (move from the extended position to the collapsed position) in response to sufficient force being applied to the forward wall 30 of the bin 26. For example, if the vehicle 10 incurs a frontal impact event, the HVAC unit 16 may be pushed into the forward wall 30 of the bin 26, which may cause the collapsible feature 44 to collapse from the extended position to the collapsed position.

As shown in FIGS. 2 and 3, in various embodiments, the forward portion 34A of the side wall 34 and the rearward portion 34B of the side wall 34 may be generally, substantially, and/or majorly planar to one another while the collapsible feature 44 is in the extended position. As shown in FIG. 4, in various embodiments, the side wall 34 may bow outward from the bin 26 as the collapsible feature 44 collapses and moves from the extended position to the collapsed position. As such, in various embodiments, the collapsible feature 44 may move from the extended position to the collapsed position by buckling or deforming in an outward direction. For example, as shown in FIG. 4, the collapsible feature 44 (depicted as a groove) may buckle or deform outward from the bin 26 as it moves to the collapsed position.

Referring now to FIGS. 2 and 3, the bin 26 may define a slot feature 48. In various embodiments, the slot feature 48 may be defined by the side wall 34 of the bin 26. In some embodiments, the slot feature 48 may extend from the upper rim 38 of the side wall 34 toward the forward wall 30. In some embodiments, the slot feature 48 may originate from a gap in the upper rim 38 of the side wall 34 between the collapsible feature 44 and the rearward wall 32 of the bin 26; further, in some examples, the slot feature 48 may extend therefrom, below the upper rim 38, along the side wall 34, at least to the collapsible feature 44. In some embodiments, the slot feature 48 may extend in a generally perpendicular direction relative to the collapsible feature 44, as shown in FIG. 3. In various embodiments, the slot feature 48 may be a void in the side wall 34 of the bin 26; however, it is contemplated that in some embodiments, the slot feature 48 may include some filling material, such as film that may be torn, without departing from the meaning of this disclosure.

Referring now to FIGS. 2-5, the bin 26 may include the arm feature 50. In various embodiments, the arm feature 50 may be coupled to the side wall 34. In some embodiments, the arm feature 50 may be integrally coupled with the side wall 34 of the bin 26. In some embodiments, the arm feature 50 may be directly coupled to the forward portion 34A of the side wall 34, as shown in FIG. 3. As further shown in FIG. 3, the arm feature 50 may extend from the forward portion 34A of the side wall 34 in the bin-rearward direction.

The arm feature 50 may include an upper periphery 50A and a lower periphery 50B. In various embodiments, the upper periphery 50A may be comprised of the upper rim 38 of the side wall 34. In various embodiments, the lower periphery 50B may be define at least a portion of the slot feature 48. This is depicted in FIGS. 2 and 3, wherein the upper and lower bounds of the arm feature 50 are delineated by the upper rim 38 of the side wall 34 and the slot feature 48, respectively. Further, in some embodiments, the arm feature 50 and the side wall 34 may define the slot feature 48, which may be positioned between the arm feature 50 and the side wall 34.

Figure 5:
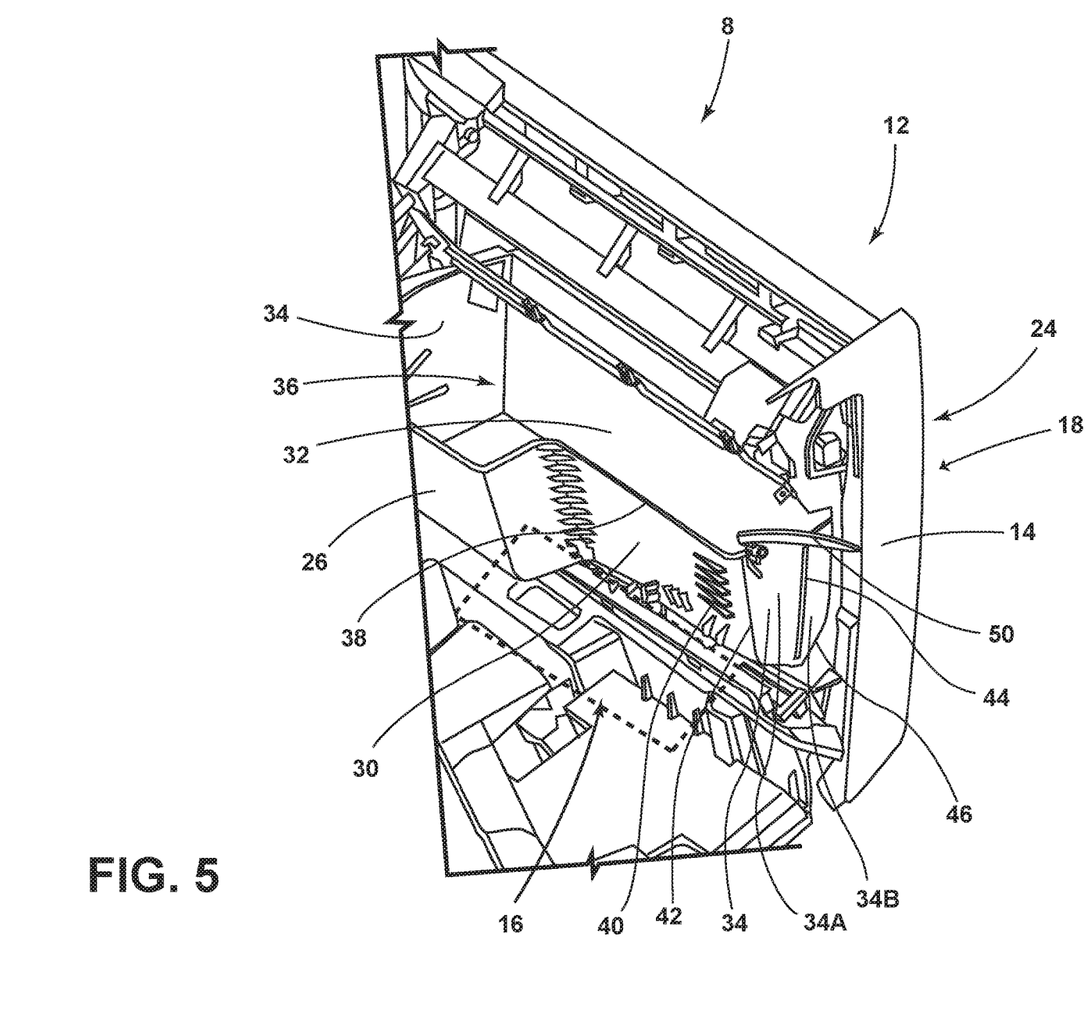
FIG. 5 is a rear elevation view of the bin, illustrating the arm feature engaged with an instrument panel of the vehicle interior, according to one embodiment.

Referring now to FIGS. 2-5, in various embodiments, the arm feature 50 may be operable between an undeployed position, as shown in FIGS. 2 and 3, and a deployed position, as shown in FIGS. 4 and 5. In some embodiments, the arm feature 50 may be generally, substantially, and/or majorly planar with the side wall 34 while in the undeployed position. In some embodiments, the arm feature 50 may be generally, substantially, and/or majorly planar with the forward portion 34A and/or rearward portion 34B of the side wall 34 while in the undeployed position.

The arm feature 50 may move from the undeployed position to the deployed position in response to the collapsible feature 44 moving from the extended position to the collapsed position. As such, the arm feature 50 may be configured to deploy and move from the undeployed position to the deployed position in response to a sufficient force being exerted upon the forward side 30 of the bin 26, such as may occur during a vehicle frontal impact event. In some embodiments, the arm feature 50 may be substantially planar to the side wall 34 of the bin 26 prior to the collapse of the collapsible feature 44. In some embodiments, the arm feature 50 may be configured to move with the forward portion 34A of the side wall 34 relative to the rearward portion 34B of the side wall 34 as the collapsible feature 44 moves from the extended position to the collapsed position. In some examples, the arm feature 50 may be configured rotate outward with the forward portion 34A of the side wall 34 as the collapsible feature 44 buckles, as shown in FIG. 4.

Referring now to FIGS. 4 and 5, in various embodiments, the arm feature 50 may be configured to protrude outward from the side wall 34 of the bin 26 while in the deployed position. In various embodiments, the arm feature 50 protruding outward from the side wall 34 while in the deployed position may be configured to engage a portion of the instrument panel 14 and may provide additional support in preventing the glove box 18 from being forced open in the a frontal impact event. In some embodiments, the arm feature 50 may be generally, substantially and/or majorly planar with the forward portion 34A of the side wall 34 while in the deployed position.

In operation, the glove box 18 may be in the closed position at the time of a frontal impact event of the vehicle 10. Upon impact, the HVAC unit 16 and/or other object may exert a sufficient force on a portion of the bin 26 (e.g., forward wall 30), such that the collapsible feature 44 collapses from the extended position to the collapsed position. The collapse of the collapsible feature 44 may, in turn, cause the arm feature 50, which is directly coupled to the forward portion 34A of the side wall 34, to rotate with the forward portion 34A of the side wall 34, such that the arm feature 50 moves from the undeployed position to the deployed position. The deployment of the arm feature 50 may cause the arm feature 50 to engage with a portion of the instrument panel 14. The engagement of the arm feature 50 with the instrument panel 14 may prevent and/or aid in preventing the glove box 18 from opening as a result of the frontal impact event.

The present disclosure may provide a variety of advantages. First, the plurality of ribs 40 may help direct the force of an object toward the forward wall-inboard direction, which may allow collapsible feature 44 to collapse in the bin-outward direction in the event of a frontal impact event. Second, the outward collapse of the collapsible feature 44 may cause the arm feature 50 to rotate outward from the bin 26, which may enable the arm feature 50 to engage the instrument panel 14. Third, engagement of the instrument panel 14 with the arm feature 50 may prevent or reduce the degree of involuntary glove box-opening during a frontal impact event. Fourth, prevention or reduction of involuntary glove box 18 opening during a frontal impact event may enable the glove box 18 to retain items during the impact event that may otherwise be forcefully ejected into the vehicle interior 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A glove box retainer assembly for retaining a glove box in a closed position during a frontal impact event of a vehicle, comprising:
    an instrument panel of the vehicle; and
    a bin of the glove box coupled to the instrument panel, wherein the bin comprises:
        a base coupled to a rearward wall, a forward wall, and a side wall, wherein the side wall is positioned between the rearward wall and the forward wall;
        a plurality of ribs coupled to the forward wall;
        a collapsible feature coupled to the side wall; and
        an arm feature coupled to the side wall and defined by a slot feature in the side wall that extends from an upper rim of the side wall toward the forward wall, wherein the collapsible feature is configured to collapse and the arm feature is configured to protrude outward from the side wall and engage the instrument panel in response to the application of a sufficient force to the forward wall of the bin.

2. The glove box retainer assembly of claim 1, wherein the plurality of ribs coupled to the forward wall terminate before reaching a corner between the forward wall and the side wall of the bin.

3. The glove box retainer assembly of claim 1, wherein the plurality of ribs protrude further outward from the forward wall as the ribs extend in a bin-outboard direction.

4. The glove box retainer assembly of claim 1, wherein the collapsible feature is configured to collapse such that the side wall of the bin deforms in an outward direction.

5. The glove box retainer assembly of claim 1, wherein the side wall comprises a forward portion positioned between the forward wall and the collapsible feature and a rearward portion positioned between the rearward wall and the collapsible feature, and wherein the arm feature is directly coupled to the forward portion.

6. The glove box retainer assembly of claim 1, wherein the arm feature is configured to be substantially planar to the side wall of the bin prior to the collapse of the collapsible feature.

7. A bin for use in a vehicle, comprising:
   a base;
   a forward wall coupled to the base;
   a rearward wall coupled to the base; and
   a side wall coupled to the base and positioned between the forward wall and the rearward wall, the side wall comprising:
      an arm feature operable between an undeployed position and a deployed position in which the arm feature is configured to protrude outward from the side wall; and
      a collapsible feature operable between an extended position and a collapsed position, wherein the arm feature is configured to move from the undeployed position to the deployed position as the collapsible feature moves from the extended position to the collapsed position.

8. The bin of claim 7, further comprising:
   a plurality of ribs coupled to the forward wall of the bin.

9. The bin of claim 7, wherein the side wall comprises a forward portion positioned between the forward wall and the collapsible feature and a rearward portion positioned between the rearward wall and the collapsible feature, and wherein the arm feature is directly coupled to the forward portion.

10. The bin of claim 9, wherein the arm feature is substantially planar with the forward portion of the side wall and the rearward portion of the side wall while in the undeployed position.

11. The bin of claim 10, wherein the arm feature is configured to move with the forward portion of the side wall relative to the rearward portion of the side wall as the collapsible feature moves from the extended position to the collapsed position.

12. The bin of claim 9, wherein the arm feature is generally planar with the forward portion of the side wall while in the deployed position.

13. The bin of claim 7, wherein the side wall of the bin and the arm feature define a slot feature positioned between the side wall and the arm feature.

14. A bin, comprising:
   a base coupled to a forward wall, a rearward wall, and a side wall, wherein the side wall is positioned between the forward wall and the rearward wall;
   an upper rim extending along the forward, rearward, and side walls of the bin;
   a collapsible feature extending along at least a portion of the side wall in a direction generally perpendicular to the upper rim of the side wall;
   a slot feature defined by the side wall, originating from a gap in the upper rim of the side wall between the collapsible feature and the rearward wall of the bin and extending below the upper rim of the side wall at least to the collapsible feature; and
   an arm feature extending from the side wall having an upper periphery and a lower periphery, wherein the upper periphery comprises the upper rim of the side wall, and the lower periphery defines at least a portion of the slot feature.

15. The bin of claim 14, wherein the slot feature extends in a generally perpendicular direction relative to the collapsible feature.

16. The bin of claim 14, further comprising a plurality of ribs coupled to the forward wall of the bin.

17. The bin of claim 14, wherein the collapsible feature defines at least a portion of the slot feature.

18. The bin of claim 14, wherein the collapsible feature comprises a groove in the side wall of the bin.

19. The bin of claim 14, wherein the side wall comprises a forward portion positioned between the forward wall and the collapsible feature and a rearward portion positioned between the rearward wall and the collapsible feature, and wherein the collapsible feature is configured to buckle outwardly in response to sufficient force being applied to the forward wall of the bin.

20. The bin of claim 19, wherein the arm feature is configured rotate with the forward portion of the side wall as the collapsible feature buckles and protrude outward therefrom.

* * * * *